Aug. 15, 1961 C. M. KRAMSKOY 2,996,699

DATA-HANDLING APPARATUS

Filed April 1, 1957 2 Sheets-Sheet 1

Inventor
C. M. Kramskoy
By Cushman, Darby & Cushman [signature]
Attys.

Aug. 15, 1961 C. M. KRAMSKOY 2,996,699

DATA-HANDLING APPARATUS

Filed April 1, 1957 2 Sheets-Sheet 2

Inventor
C. M. Kramskoy
By Cascock Downing & Seebold
Attys.

2,996,699
Patented Aug. 15, 1961

2,996,699

DATA-HANDLING APPARATUS

Charles Mark Kramskoy, Ealing, London, England, assignor to Electric & Musical Industries Limited, Middlesex, England, a company of Great Britain Filed Apr. 1, 1957, Ser. No. 649,779
Claims priority, application Great Britain Apr. 4, 1956
4 Claims. (Cl. 340—172.5)

Figure 1:
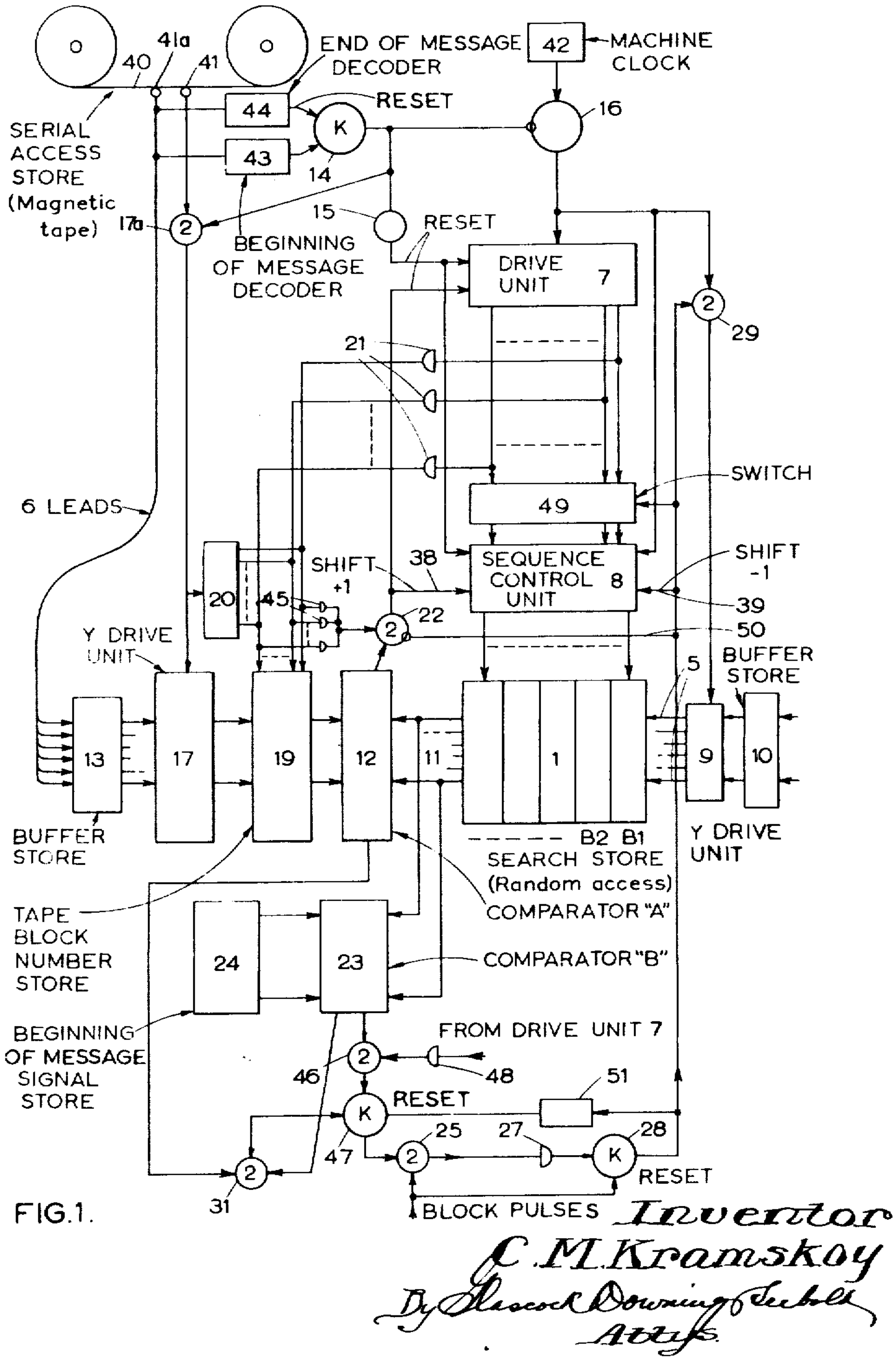

This invention relates to data handling apparatus.

It has been proposed to provide automatic data handling apparatus capable of performing accounting book-keeping of similar commercial operations. Input data may be fed into such an apparatus with the aid of punched cards or tapes, or by means of electric typewriters. A representative apparatus may for example have a total of 100 keyboards for feeding input information into the apparatus. To deal with such information it may be necessary to draw upon large amounts of auxiliary data stored in the apparatus, such information for example comprising customers names and addresses, customers credits, data as to stock position and so on. This data tends to be bulky and to comprise by far the larger proportion of the data which has to be stored and because of its bulk it is most convenient to store it in magnetic tape stores. However the use of stores of this character introduces the problem of gaining rapid access to the data. This problem arises because, although the magnetic tape can be read at a relatively high rate, for example of the order of 20,000 characters a second, this rate may be slow compared with the rate of operation of other parts of the machine, which may be of the order of 100,000 characters a second. The disparity of rates is in fact greater than suggested by the ratio of the two rates since the total number of "cells" of information in the magnetic tape stores may be large, for example 80,000 and in general access to a particular cell can be obtained only by scanning the tape serially. Consequently each demand for data from the magnetic tape stores has to await the scanning of the tape to find the relevant data on it. On the other hand input data will generally be fed to the apparatus in random order.

The object of the present invention is to provide improved data handling apparatus with a view to matching the demand for information from serial access stores to the ability to produce such data.

According to one form of the present invention there is provided data handling apparatus comprising a serial access store having a relatively large number of storage locations, each storage location having an identification signal space and an information signal space, means for serially scanning said store to derive identification signals in succession from said locations, a temporary store for storing each derived identification signal during an interval before the next identification signal is derived, first timing means for applying identification signals from said serial access store into said temporary store at a first rate, a search store with a plurality of storage locations for storing incoming identification signals, comparison means, control means for applying an identification signal from said search store and an identification signal from said temporary store to said comparison means to derive a conformity signal or a disconformity signal, said control means including further timing means for applying an identification signal from said temporary store to said comparison means and identification signals from said search store to said comparison means at a different rate from said first rate, said control means being responsive to a disconformity signal for applying the next identification signal from the search store and the same identification signal from the temporary store to said comparison means to derive another conformity signal or disconformity signal, the rate of operation of said control means being predetermined for the successive application of identification signals from all locations of said search store to said comparison means during each said interval, means responsive to a conformity signal for conditioning said apparatus for access to the respective information signal space of the serial access store.

Figure 2:
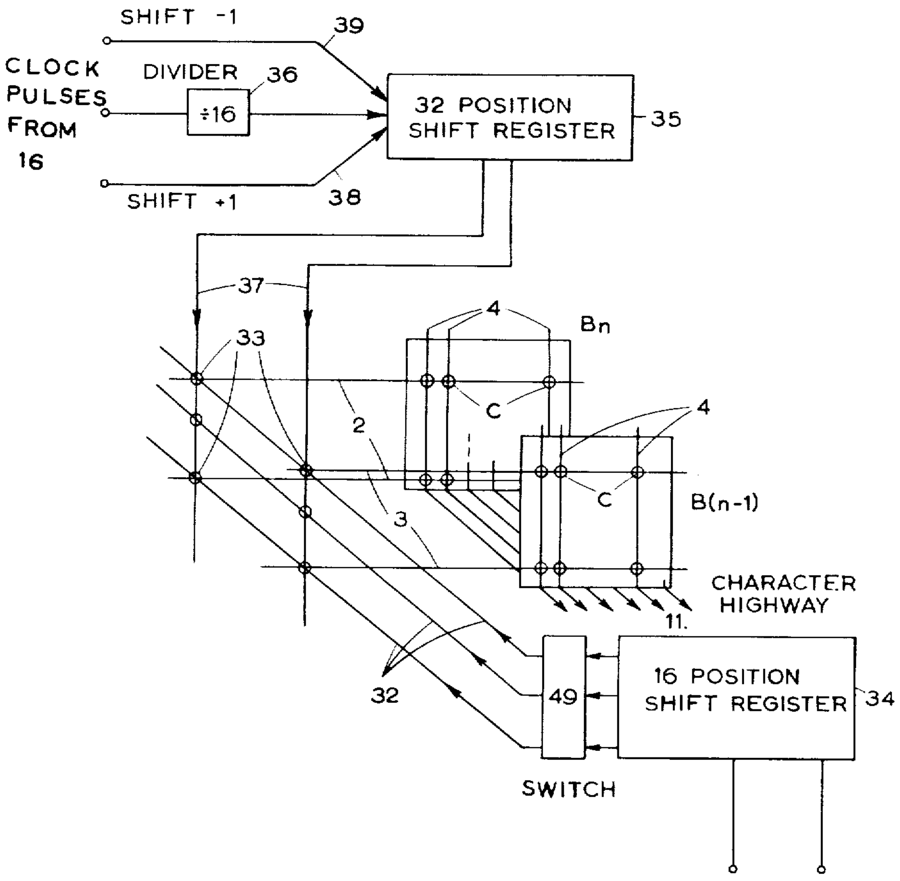

In order that the invention may be clearly understood and readily carried into effect, the invention will now be described with reference to the accompanying drawings, in which:

FIGURE 1 illustrates diagrammatically and in block form one example of the search unit for data handling apparatus in accordance with the invention, and FIGURE 2 illustrates in more detail the construction of the search store, the sequence control unit and the drive unit employed in FIGURE 1.

In the apparatus in which the search unit shown in FIGURE 1 is employed, it will be assumed that input data is fed to buffer stores prefixed by one or more block numbers whereby related information may be identified in the serial access stores. The block number will comprise the customers identification code if the invention is used in apparatus such as described in the parent specification. The buffer stores for the input data may be magnetic drum stores, magnetic core stores or tape stores, as the situation requires, and for the purpose of simplifying the description it will be assumed that only a single block number is prefixed to each cell of input data. The serial access store will however be assumed to be a magnetic tape store, with the cells of information therein preceded by a beginning of message signal and the block number signal. Moreover the end of each block number signal is marked by an end of message signal. The combined beginning of message signal, block number signal and end of message signal will be assumed to comprise sixteen characters, each character being coded in a binary decimal code in which six digital places or elements are allotted to each character.

The search unit of the apparatus comprises a search store 1 which will be assumed to have a capacity for thirty-two or more block numbers, and unless the context otherwise requires a block number will be assumed to include the beginning of message signal as well. The search store is preferably a store of the magnetic core matrix type comprising a separate sub-matrix or block for each block number. The blocks are denoted by the references B1, B2 . . . B$n$, B($n-1$) . . . in the drawings. Each block in turn comprises sixteen rows of magnetic cores, corresponding to the sixteen characters of a block number. Furthermore each row comprises six cores, so that each block has six columns, corresponding to the six code elements of each character. The cores are in the form of small washers of magnetisable material and each row has a separate control circuit, hereinafter termed X control circuit, the washers in a row being threaded on the conductor of the respective X control circuit. Moreover each column has a control circuit, termed Y control circuit, which can be used for feeding a digital code element into the sub-matrix or for deriving a digital code element from the sub-matrix, the cores in a column being threaded on the conductor of the respective Y-circuit. There is also a read-out circuit for each column, some of which are partly shown in FIGURE 2. In FIGURE 1, it can be assumed that the blocks B1, B2 . . . are stacked face to face, so that the top edges of the blocks only are visible. The rows are therefore arranged one below the other, and the columns are vertical. In FIGURE 2 of the drawings, the references B$n$ and B($n+1$) denote blocks in the search store 1 and a few of the cores in each block are denoted by the reference C. References 2 denote the X control circuits for two rows in the block B*n* whilst the references 3 denote two X control circuits for the block B(*n*−1). Similarly the references 4 denote read-out circuits in the blocks B*n* and B(*n*+1) the circuits there being six such circuits for each block (one for each digital place in a character). The read out circuits of all the blocks in th esearch store lead to a common character highway 11. In FIGURE 2 the block B(*n*−1) is shown displaced laterally from the block B*n* for convenience of illustration. The Y-circuits are not shown in FIGURE 2, but they comprise six conductors which are threaded in series through the cores in the respective columns, and which moreover pass in succession from one block to the next, so that there is one group of six Y-circuits for the whole matrix 1, one Y circuit for each digital place in a character. Two Y control circuit conductors are shown in FIGURE 1, being denoted by the reference 5. The construction of the X and Y control circuits and the read-out circuits have not been illustrated completely in FIGURES 1 and 2 since the construction is well known to those skilled in the art. The construction of such circuits may for example be as described in the "Proceedings of the I.R.E.," October 1953, the article entitled "A Myriabit Magnetic Core Matrix Memory" beginning on page 1,407. The X control circuits 2 and 3 and the read-out circuits 4 are shown by means of single conductors in FIGURE 2, but in practice they form closed loops, in known manner. The same is true of the Y control circuits.

The X control circuits are controlled as indicated through a drive unit and a sequence control unit which are denoted in general by the references 7 and 8 in FIGURE 1 and will be described in more detail subsequently with reference to FIGURE 2. The magnetic cores used in the search stores 1 are set up so that a binary digit of value "1" is represented by remanence magnetism of one polarity and a binary digit of value "0" is represented by remanence magnetism of opposite polarity. If a binary one signal occurs on any Y control circuit and simultaneously a read in pulse occurs on any X control circuit then the magnetic core which is common to the X and Y control circuits is changed to the state of remanence magnetism representing the binary one digit. In the present application the six binary code elements representing a character are applied simultaneously in parallel to the six Y control circuits of the search store 1, which as aforesaid are common to all the blocks and the code elements are stored in the correct row of the correct block under the control of the units 7 and 8 which are arranged so that an X driving pulse is applied only to the row corresponding to the appropriate character in the appropriate block. The parallel feed to the search store of the six code elements representing a character is effected by means of a Y drive unit 9 which controls the transmission of block number signals from an intermediate buffer store 10 to the search store 1. The Y drive unit 9 is in the form of a simple gating circuit which is normally closed but which is opened at appropriate times by gating pulses from a gate 29 as will appear subsequently. The intermediate buffer store 10 may be magnetic drum or other form of store and may be used for storing demand signals in the form of block numbers associated with preliminary data until such time as related data is derived from the serial access store, the preliminary data being generated by other parts of the machine, as described in the parent specification. Moreover, the buffer store is operated to apply demand signals cyclically to the unit 9, whether the unit is responsive or not. A character in any block of the search store 1 can be fed out of the search store to the character highway 11 by a head-out pulse on the appropriate X control circuit, the Y drive unit 9 remaining inactive. When a character is read out this way, the appropriate code elements are applied as indicated to the highway 11 to the comparator circuit 12 labelled comparator "A" in the drawing. It will be appreciated that the read-out pulses on the X control circuits have to be of twice the amplitude of, and of opposite polarity from, read-in pulses.

When the apparatus is in use, incoming block numbers may appear in the intermediate buffer store 10 and be transferred to the search store 1 in random order. While such block numbers are being fed to the buffer store 10 in random order, the magnetic tape 40 constituting the serial access store is scanned repeatedly, at however a different rate from the normal rate of operation of the apparatus. To allow for such different rates of operation, the apparatus employs two sets of clock pulses, one set derived, from a reference pulse track on the tape 40, by a magnetic head 41 and the other derived from a master pulse generator 42 termed the machine clock. For simplicity the following description will be confined to a single serial access store though in practice there may be several such stores. There may moreover be more than one search unit and in the latter case the apparatus may also have recognition means for identifying the particular serial access store holding the required data demanded by a particular block number. During the scanning of the serial access store, characters picked up by a head 41*a* flow into an intermediate buffer store 13 which may be similar to the store 10. Furthermore beginning and end of message signals are identified by appropriate decoders 43 and 44 which may be any suitable construction. When a beginning of message signal in the serial access store is detected, this signal is caused to trigger a two-state device 14 into state "1," the device 14 being for example a conventional Eccles Jordan trigger circuit or an equivalent circuit employing transistors.

This applies a resetting pulse by way of a gate 15 to the drive unit 7 and sequence control unit 8 and resets them to the block "1" and row "1" positions. The two-state device 14 also inhibits a gate 16 which normally admits machine clock pulses from the generator 42 to the units 7 and 8. Furthermore it conditions a gate 17*a* to admit tape clock pulses to a drive unit 18 which is similar to the above-mentioned Y drive unit 9. The drive unit 18 controls the Y control circuits of a tape block number store 19 which is a magnetic core matrix of sixteen rows and six columns sufficient to accommodate a block number. It is thus similar to one block of the search store 1. The X control circuits for the rows of this matrix can be controlled either by the main X drive unit 7 through the intermediary of delay devices 21 or directly by a separate X-drive unit 20 operable only by tape clock pulses from 18. When the gate 17 transmits tape clock pulses, as aforesaid, the drive unit 20 is operated and causes read-in pulses to appear in succession on the sixteen X control circuits of the store 20 whilst the Y drive unit 18 is simultaneously operated by tape clock pulses from the gate 17*a*. This causes the respective tape block number, to be transferred to the block number store 19. During this operation, no output is obtained from the search store 1, by reason of the inhibition on the gate 16.

When the end of message signal is identified on the tape, the two-state device 14 is restored to state "0" by the output of the decoder 44. The gate 17*a* is then closed and the inhibition is removed from the gate 16 so that the machine clock pulses can now be applied to the drive unit 7 and the sequence control unit 8. These units cooperate together to apply read-out signals in succession to the sixteen rows of each successive block of the search store 1 (provided the search is not ended by finding a demanded block number), causing the six code elements consituting each character to be fed in succession to the comparator 12. The comparator 12 may consist of six two-state devices which receive inputs respectively from the six read-out circuits which constitute the character highway 11 in such a way that any two state device which receives a signal corresponding to a binary "1" digit is switched to state "1" but otherwise remains in state "0." Read-out pulses are now also applied to the rows of the tape block number store from the drive unit 7 (there being no input to the unit 20), with however a delay introduced by the delay elements 21. The delay causes the characters in the store 19 to be applied to the comparator 12 just after the respective characters from the store 1 and the drive from 19 to the comparator 12 is such that a binary "1" signal from the store 19 tends to switch the respective two-stage device of the comparator to state "0." Consequently each time a character from the search store 1 is the same as the corresponding character from the block number store 19, all the two state devices in the comparator 12 will be restored to state "0" and so long as this condition prevails, the comparison operation is allowed to continue. However as soon as any of the two-state devices in comparator A is left in state "1," after a comparison operation, a signal is sent out through a gate 22 which advances the sequence control unit to the next block in the search store and resets the drive unit to line one thereof. To ensure that such a signal can only arise after a comparison operation is completed, the gate 22 has a threshold of 2, and the read-out signals for the store 19 are applied to one input of the gate 22 via buffer devices 45 which have appropriate delays to allow the comparator to settle after a comparison operation. A suitable construction for the comparator A is for example described in British specification No. 730,854. This process of successively investigating each block in the search store is continued as long as identity is not established between the block number in the tape store 19 and any block number in the search store 1. As the probability of a coincidence between any pair of characters is 0.1, three comparison operations between any two block numbers has an equivalent coincidence probability of 0.001. Therefore in general the sequence control unit 8 will be advanced to the next block after a comparison of only about two characters in any pair of block numbers. The entire search store 1 may therefore be investigated with considerable rapidity and bearing in mind that comparisons are effected at machine clock rate, it is readily possible to investigate the entire contents of the search store 1 in the interval between the occurrence of two block numbers of the tape.

The apparatus comprises a further comparator 23 labelled comparator B in the drawing which may be of the same construction as the comparator A. One input of this comparator is derived from a permanent store 24 in which is set up the beginning of message signal. Since as aforesaid each block number in the search store 1 is prefixed by a beginning of message signal the comparator 23 will show coincidence each time the beginning of message signal is read from the search store 1. If comparator 23 shows non-coincidence, this indicates that the corresponding block in the search store 1 is empty. When this occurs the comparator 12 sets up an output signal which is transmitted by the gate 46, which is of threshold 2, to a two state device 47 which is thereupon changed to state "1." The gate 46 receives a second input via a buffer device 48 (similar to 45) from the X control circuit in 7 which applies the signal for reading the beginning of message signal from any block in the store 1. The trigger device 47 when in state "1" sensitises a threshold two gate 25 so that it can transmit the next block pulse to occur, a block pulse being a pulse occurring at the beginning of an sending out cycle on any one block of the store 1. When a block pulse occurs it passes through a delay element 27 to a two state device 28, changing the two-state device to state "1" and causing it to operate a switch 49 whereby the drive unit 7 is caused to generate read-in pulses instead of read-out pulses. Moreover, the two state device 28, when in state "1" counteracts the shift of the sequence control unit 7 to the next block, by producing a reverse shift immediately after the shift has occurred, and also conditions the gate 29 to tarnsmit machine clock pulses to the Y control unit 9 whereby any block number in the intermediate buffer store 10 is passed to the empty block in the search store 1. During this procedure, any output from the comparator 12 is inhibited by application of an inhibiting signal via a conductor 50 to gate 22. The aforesaid block pulses occurs at the beginning of each sixteen character times, taken at the machine rate, and it will be observed that the two-state device 28 is reset by block pulses. Therefore when the two-state device 28 is changed to state "1" by any block pulse, it remains in this state for sixteen character intervals and is then reset, so that only one block number is entered by the Y control unit 9 into he search store 1. The resetting of the two state device 28 causes the reseting of the two state device 47 through the intermediary of a differentiating and limiing circuit 51. The delay device 27 ensures that the block pulse which changes the two-state device 28 to state "1" is not counteracted by the same block pulse tending to switch 28 to state "0."

So far the operation of the machine has been described on the assumption that identity is not established between a block number from the search stroe 1 and from the store 19. Assume now that identity is established. In this event both the comparators 12 and 23 will show conformity (all "zeros") and signals are applied to the threshold-two gate 31. An output is then derived from this gate and by the action of the element 47, 25, 27 and 28 operates the Y control unit 9 to fill the respective block of the search store 1 with any block number from the intermediate buffer store 10. If this store is empty the respective block of the search store 1 is filled with zeros. The search unit then remains inoperative until the next beginning of message signal on the tape is identified and the searching operation above described is then repeated. The output from the threshold-two gate 31 is also employed in a manner which is not shown, to extract the desired related data from the serial access store, and combining it with the preliminary data which gives rise to the demand for access to the serial access store. Since this extraction does not commence immediately after reading the block number from the tape, allowance has to be made for an interval between the reading of the block number and the extraction of any information which may be desired.

As shown in FIGURE 2 the drive unit 7 may comprise a sixteen stage shift register 34 which in response to a series of sixteen machine clock pulses feeds pulses via the switch 49 successively to sixteen row-selecting circuits, three of these circuits being represented by the reference 32. Each X control circuit in the search store 1 is linked inductviely with a core on one of the row selecting circuits 32. The last-mentioned cores may be termed core transformers and some of these transformers are denoted by the reference 33. It will therefore be appreciated that there are sixteen core transformers for each block in the search store 1, and the core transformers for the first rows of all the blocks are threaded on the first of the row-selecting circuits 32. Similarly the core transformers for the second rows of all the blocks are threaded on the second row-selecting circuit, and so on.

The sequence control unit 8 may, as shown in FIGURE 2, comprise a thirty-two stage shift register 35. This receives an input of clock pulse from the gate 16 by way of a frequency dividing circuit 36 which divides the clock pulse by sixteen so that the shift register is advanced by one stage after each sixteen clock pulses, that is each sixteen character intrevals. An output is taken from each of the stages in this register, these outputs constituting block selecting circuits for the search store 1, such as the two circuits 37. As represented in FIGURE 2, the core transformers for the block B$n$ are threaded in the block B$n$ selecting circuit from the shift register 35. Similarly the core transformers for block B($n-1$) of the search store 1 are arranged on the output circuit associated with stage ($n-1$) of the register 35 and so on. The reference 38 and 39 in FIGURE 2 represent the output leads from the gate 22 and the two state device 28 of FIGURE 1.

From the foregoing description of FIGURE 2 it will be appreciated that the shift register will advance 34 one stage on the occurrence of each clock pulse and so transfer the drive from a particular row of a particular block in the search store 1 of the next row in the same block thus causing the sixteen rows in each block to be driven in succession, the drive resulting in a read-out or read-in operation depending upon the condition of the switch 49. The switch 49 may be of any suitable construction. The block investigated at any one time is determined by the position of the shift register 35 and after the sixteen rows of any one block have been investigated, the next clock pulse to occur will produce an output from the dividing circuit 36 causing the core transformers associated with the next block of the search store to be energised, so that the sixteen rows of this block are then driven in succession by the output from the shift register 34. The output of the dividing circuit 17 may be used as the block pulses in the apparatus.

It will be understood that read-out from the stores 1 and 12 must be of the non-destructive character, so that the read-out circuits must be of a known non-destructive type.

What I claim is:

1. Data handling apparatus comprising a serial access store having a relatively large number of storage locations, each storage location having an identification signal space and an information signal space, means for serially scanning said store to derive identifications signals in succession from said locations, a temporary store for storing each derived identification signal during an interval before the next identification signal as derived, a search store with a plurality of storage locations for storing incoming identification signals, comparison means, control means for applying an identification signal from said search store and an identification signal from said temporary store to said comparison means to derive a conformity signal or a disconformity signal, said control means being responsive to a disconformity signal for applying the next identification signal from the search store and the same identification signal from the temporary store to said comparison means to derive another conformity signal or disconformity signal, the rate of operation of said control means being predetermined for the successive application of identification signals from all locations of said search store to said comparison means during each said interval, means responsive to a conformity signal for conditioning said apparatus for access to the respective information signal space of the serial access store, means for comparing an initial part of each identification signal from the search store with a predetermined beginning-of-message signal to derive a conformity signal or a disconformity signal, and means responsive to a disconformity signal from said further comparison means for admitting a further incoming identification signal to said search store.

2. Data handling apparatus comprising a serial access store having a relatively large number of storage locations, each storage location having an identification signal space and an information signal space, means for serially scanning said store to derive identification signals in succession from said locations, a temporary store for storing each derived identification signal during an interval before the next identification signal is derived, first timing means for applying identification signals from said serial access store into said temporary store at a first rate, a search store with a plurality of storage locations for storing incoming identification signals, comparison means, control means for applying an identification signal from said search store and an identification signal from said temporary store to said comparison means to derive a conformity signal or a disconformity signal, said control means includinug further timing means for applying an identification signal from said temporary store to said comparison means and identification signals from said search store to said comparison means at a different rate from said first rate, said control means being responsive to a disconformity signal for applying the next identification signal from the search store and the same identification signal from the temporary store to said comparison means to derive another conformity signal or disconformity signal, the rate of operation of said control means being predetermined for the successive application of identification signals from all locations of said search store to said comparison means during each said interval, means responsive to a conformity signal for conditioning said apparatus for access to the respective information signal space of the serial access store.

3. Apparatus according to claim 2 wherein said search store comprises a matrix of magnetic core elements, arranged in blocks each capable of storing one identification signal, said control means including drive means for applying read out signals successively to cores in a block to reproduce an identification signal therefrom, and sequencing means for rendering said drive means operative on the blocks sequentially.

4. Apparatus according to claim 3, wherein said temporary store comprises a matrix of magnetic core elements.

References Cited in the file of this patent

UNITED STATES PATENTS

| | | |
|---|---|---|
| 2,702,380 | Brustman et al. | Feb. 15, 1955 |
| 2,721,990 | McNaney | Oct. 25, 1955 |
| 2,785,388 | McWhirter et al. | Mar. 12, 1957 |